United States Patent
Naismith et al.

[11] 3,879,680
[45] Apr. 22, 1975

[54] DEVICE FOR REMOVING AND DECONTAMINATING CHEMICAL LASER GASEOUS EFFLUENT

[75] Inventors: Robert Naismith, Fairfax; Robert Stephen Scheffee, Lorton, both of Va.

[73] Assignee: Atlantic Research Corporation, Fairfax, Va.

[22] Filed: Feb. 20, 1973

[21] Appl. No.: 333,581

[52] U.S. Cl............. 331/94.5 G; 23/252 R; 23/281; 23/284; 60/214; 250/527; 423/490
[51] Int. Cl........... H01s 3/00; B01j 1/00; B01j 7/00
[58] Field of Search................ 23/284; 252/188.3 R; 423/240, 489, 490, 643; 149/19.4, 19.5, 19.9, 19.91, 73, 35; 204/DIG. 11; 60/214, 215

[56] References Cited
UNITED STATES PATENTS

| | | | |
|---|---|---|---|
| 2,767,233 | 10/1956 | Mullen et al. | 23/284 X |
| 2,799,159 | 7/1957 | Sabol | 23/284 UX |
| 2,991,166 | 7/1961 | Ferguson | 149/19.9 |
| 3,198,677 | 8/1965 | Thomas | 149/19.4 |
| 3,692,597 | 9/1972 | Brockway et al. | 149/19.4 |
| 3,694,770 | 9/1972 | Burwell et al. | 23/284 X |
| 3,699,209 | 10/1972 | Ward | 423/240 |
| 3,709,978 | 1/1973 | Predikant | 423/240 |

*Primary Examiner*—Morris O. Wolk
*Assistant Examiner*—Arnold Turk
*Attorney, Agent, or Firm*—Martha L. Ross

[57] ABSTRACT

A device for removing low-pressure effluent gases containing hydrogen fluoride or deuterium fluoride from a chemical laser system, comprising a gas generator containing a gas-generating composition which burns to produce high-temperature gaseous combustion products including gaseous alkali metal hydroxide, gaseous alkali metal, or mixtures thereof, and provided with a restricted nozzle for producing high-velocity gas stream of said combustion products, and a chamber adapted to receive the gas stream venting from said nozzle, said chamber having inlet means for the low-pressure effluent gases and exit means for the mixed gas stream resulting from admixture within the chamber of the combustion gas stream and the low-pressure effluent gases. The exit means may include conventional means, such as a convergent-divergent diffuser, to increase, if necessary, the pressure of the mixed product gas stream above ambient pressure to ensure its ejection.

A method for removing low-pressure effluent gases containing hydrogen fluoride or deuterium fluoride from a chemical laser system comprising burning a gas-generating composition to produce high-temperature gaseous combustion products containing gaseous alkali metal hydroxide, gaseous alkali metal, or mixtures thereof, venting said combustion products through a restricted nozzle to produce a total high-velocity gas stream, entraining in and admixing with said gas stream said low-pressure effluent gases to produce a mixed gas stream and permitting said gaseous alkali metal hydroxide, gaseous alkali metal, or mixtures thereof to react with said hydrogen fluoride or deuterium fluoride. Additionally, if required, the pressure of the mixed gas stream can be increased to a pressure above ambient pressure.

12 Claims, 1 Drawing Figure

PATENTED APR 22 1975 3,879,680
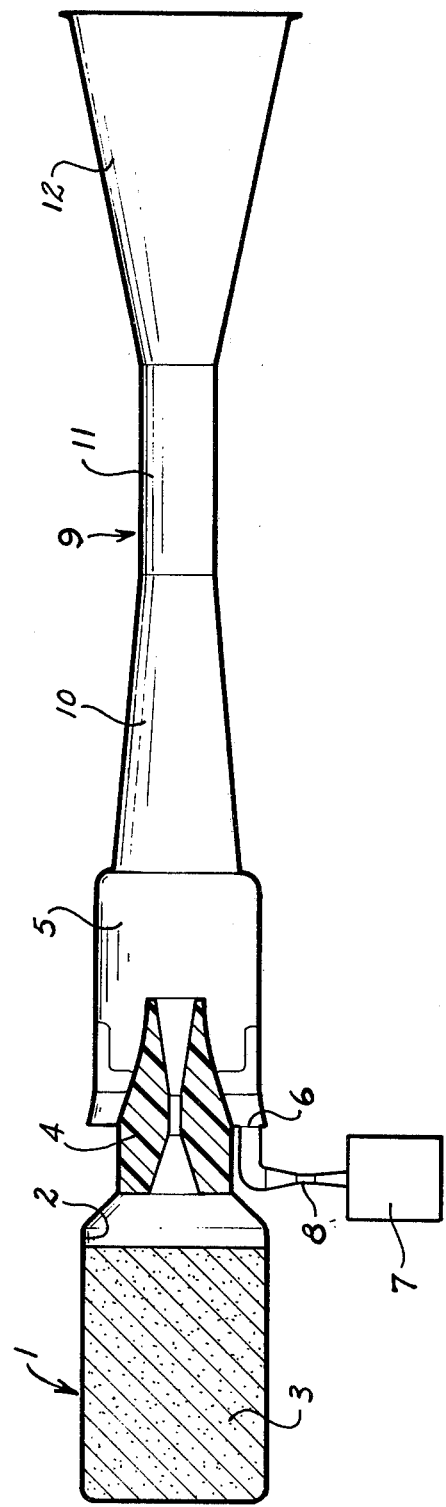

DEVICE FOR REMOVING AND DECONTAMINATING CHEMICAL LASER GASEOUS EFFLUENT

BACKGROUND OF THE INVENTION

Present HF or DF chemical mixing lasers require mechanical pumps and roots blowers to compress the working gases and diluents which normally comprise about 10 vol. percent HF or DF and 90 vol. percent He, from the few torr in the optical cavity to atmospheric or ambient pressure for discharge. The HF or DF is usually cryopumped to prevent atmospheric release of the highly toxic materials, which must subsequently be subjected to decontamination treatment. Such procedures require a multistep treatment system including costly and complex equipment.

The device and process of the invention effect simultaneous pumping and decontamination in a relatively small, reliable system, which has no or very few moving parts and which can nevertheless provide great treatment versatility. The invention not only provides a simultaneous solution to the chemical laser ejection and decontamination problems but also incorporates all of the advantages inherent in solid fuels. The ejector gas is, in effect, stored as a high-density solid having the high potential power, long-term storage stability, and reliability characteristic of many of the solid fuels developed by modern gas-generating technology. Additionally, by varying the composition of the solid gas-generating compositions and the size or geometry of the restricted nozzle, ejector gas flow rates and functioning times available to the pumping and decontamination procedure are virtually unlimited.

SUMMARY OF THE INVENTION

Broadly the invention comprises discharging from a restricted nozzle a high-velocity jet of the high-temperature gaseous combustion products of a gas-generating composition into a chamber provided with an inlet connected to the low-pressure chemical laser system. The high-velocity jet exerts an aspirator action which pumps the low-pressure gaseous effluent from the laser cavity and entrains and mixes with it. If the pressure of the mixed gases is reduced by the low-pressure laser effluent to a level below ambient pressure, the mixed gases are pressurized as, for example, by passage through a conventional convergent-divergent diffuser, to ensure venting to ambient pressure.

The gas-generating composition is compounded to produce, upon combustion, gaseous combustion products which include gaseous alkali metal hydroxide, gaseous alkali metal, or mixtures thereof. Upon admixture with the chemical laser effluent gases, the alkali metal hydroxide and/or alkali metal react in gas phase with the HF and/or DF in the effluent to produce alkali metal fluoride. The alkali metal fluoride is considerably less toxic and corrosive than HF or DF and, unlike these compounds, is readily condensable and, therefore, easily removable.

BRIEF DESCRIPTION OF THE DRAWING

The FIGURE is a schematic illustration in longitudinal section of a device of the invention.

DETAILED DESCRIPTION

The gas-generating composition can be any composition which burns to produce gaseous combustion products including an alkali metal hydroxide and/or free alkali metal. The preferred alkali metal species are potassium, sodium, and lithium. Of these, potassium and sodium are particularly preferred because of their generally lower cost and availability.

Composite propellant type gas-generating compositions are particularly suitable because of their compounding versatility, generally excellent stability and shelf life, well-developed manufacturing technology, reliability, and reproducibility. Such propellants generally comprise an organic polymer fuel which may be inert or energetic, an inert or energetic organic plasticizer, and a solid inorganic or organic oxidizer. Examples of inert polymer fuels include, but are not limited to, polybutadienes, polybutadieneacrylic or -methacrylic acid, polyurethanes, polyesters, polyalkylenes, cellulose ethers and esters, and the like. Examples of energetic organic polymers include nitrocellulose and other nitrated or nitrited organic compounds. Illustrative examples of suitable inert organic plasticizers include alkyl sebacates, phthalates, adipates, and the like. Illustrative examples of energetic plasticizers include nitroglycerine, butane trioltrinitrate (BTTN), trimethylolethanetrinitrate (TMETN) and the like.

To produce the desired alkali metal hydroxide or free alkali metal combustion products, it is essential to include an alkali metal compound in the gas-generating composition, preferably in the form of halogen-free oxidizer salt, such as an alkali metal nitrate. Such salts have the dual advantages of functioning as oxidizing agents and providing the desired alkali metal products. Alternatively or in addition, the composition can include other decomposable alkali metal salts, such as sodium or potassium azide, as well as other oxidizers, preferably halogen-free, such as solid organic oxidizers, e.g. cyclotetramethylene tetramine. Formulation of the gas-generating compositions aforedescribed are, in general, within the conventional skill of the art, including designed levels of production of the desired alkali metal combustion products.

Example

The combustion products and their quantitative yields were calculated for several gas-generating compositions. Results are shown in Tables I, II, and III.

Table I

| Propellant Composition (weight percent) | 14% TMETN 14% Polyester Resin 72% $NaNO_3$ | | 14% TMETN 14% Polyester Resin 72% $KNO_3$ | |
|---|---|---|---|---|
| | Chamber | Throat | Chamber | Throat |
| Pressure (psia) | 100 | 57.14 | 100 | 56.5 |
| Temperature (°K) | 1,832 | 1,700 | 1,810 | 1,650 |
| | Yield (gm mol/100 gm) | | Yield (gm mol/100 gm) | |
| $NaOH$ | 0.790 | 0.767 | | |
| $H_2O$ | 0.358 | 0.356 | | |
| $Na$ | 0.007 | 0.004 | | |
| $CO_2$ | 0.947 | 0.948 | | |
| $N_2$ | 0.504 | 0.505 | | |
| $OH$ | 0.001 | 0.000 | | |
| $Na_2O_2H_2$ | 0.024 | 0.038 | | |
| $O_2$ | 0.120 | 0.120 | | |
| $NO$ | 0.003 | 0.001 | | |
| $KOH$ | | | 0.670 | 0.674 |
| $CO$ | | | 0.067 | 0.068 |
| $H_2$ | | | 0.009 | 0.010 |
| $K$ | | | 0.042 | 0.038 |
| $CO_2$ | | | 0.880 | 0.880 |
| $H_2O$ | | | 0.434 | 0.430 |
| $N_2$ | | | 0.438 | 0.438 |

Table II

| Propellant Composition (weight percent) | 22% Nitrocellulose 33% BTTN 45% NaNO$_3$ | | | 15% Nitrocellulose 22.5% BTTN 12.5% TCE[1] 50% NaNO$_3$ | |
|---|---|---|---|---|---|
| | Chamber | Throat | | Chamber | Throat |
| Pressure (psia) | 200 | 114.5 | | 200 | 115.1 |
| Temperature (°K) | 2,421 | 2,260 | | 2,666 | 2,512 |
| | Yield (gm mol/100 gm) | | | Yield (gm mol/100 gm) | |
| NaOH | 0.477 | 0.490 | NaOH | 0.381 | 0.385 |
| CO | 0.022 | 0.011 | CO | 0.234 | 0.198 |
| CO$_2$ | 1.010 | 1.021 | CO$_2$ | 1.056 | 1.091 |
| H$_2$ | 0.002 | 0.001 | H$_2$ | 0.011 | 0.010 |
| H$_2$O | 0.533 | 0.531 | H$_2$O | 0.322 | 0.326 |
| Na | 0.045 | 0.034 | Na | 0.197 | 0.197 |
| NaO | 0.006 | 0.004 | NaO | 0.008 | 0.005 |
| N$_2$ | 0.559 | 0.562 | NO | 0.011 | 0.007 |
| O$_2$ | 0.259 | 0.256 | N$_2$ | 0.691 | 0.693 |
| OH | 0.019 | 0.012 | O$_2$ | 0.030 | 0.017 |
| O | 0.002 | 0.001 | OH | 0.381 | 0.385 |
| | | | O | 0.002 | 0.001 |
| | | | H | 0.002 | 0.002 |

[1]Tetracyanoethylene

Table III

| Propellant Composition (weight percent) | 20% Nitrocellulose 30% BTTN 50% KNO$_3$ | | | 15% Nitrocellulose 22.5% BTTN 12.5% TCE 50% KNO$_3$ | |
|---|---|---|---|---|---|
| | Chamber | Throat | | Chamber | Throat |
| Pressure (psia) | 200 | 113.9 | | 200 | 113.2 |
| Temperature (°K) | 2,277 | 2,107 | | 2,589 | 2,380 |
| | Yield (gm mol/100 gm) | | | Yield (gm mol/100 gm) | |
| KOH | 0.475 | 0.482 | KOH | 0.333 | 0.335 |
| CO | 0.008 | 0.003 | CO | 0.402 | 0.390 |
| CO$_2$ | 0.930 | 0.935 | CO$_2$ | 0.887 | 0.899 |
| H$_2$O | 0.470 | 0.468 | H$_2$ | 0.024 | 0.026 |
| KO | 0.003 | 0.001 | H$_2$O | 0.338 | 0.339 |
| NO | 0.014 | 0.009 | K | 0.159 | 0.158 |
| N$_2$ | 0.517 | 0.519 | KO | 0.002 | 0.000 |
| OH | 0.010 | 0.006 | NO | 0.003 | 0.000 |
| O$_2$ | 0.245 | 0.245 | N$_2$ | 0.648 | 0.649 |
| K | 0.017 | 0.011 | OH | 0.008 | 0.003 |
| | | | O$_2$ | 0.003 | 0.000 |
| | | | H | 0.003 | 0.001 |

The gaseous alkali metal hydroxide and free alkali metal combustion products react with HF (or DF) as follows, where M= alkali metal:

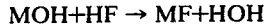

MOH+HF → MF+HOH

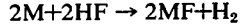

2M+2HF → 2MF+H$_2$

The reactions are preferably carried out at high temperatures to achieve rapid gas-phase reaction rates, to prevent carbonate formation where CO$_2$ is present in the combustion products, and to prevent nozzle clogging by condensed salts. The requisite high temperatures, e.g. a minimum nozzle throat temperature of about 1430°K for sodium-containing propellant and about 1610°K for potassium-containing propellant, can readily be obtained by suitable composition and grain design of the propellant and by varying nozzle configuration.

For practical considerations of avoiding nozzle clogging by condensation of other combustion products, it is advisable to avoid incorporating into the propellant compositions metallic fuels and oxidizers which form combustion products, e.g. oxides, which condense at temperatures below the condensation temperatures of the desired alkali metal products.

The concentration of free alkali metal or hydroxide in the gas-generator combustion products should be sufficient to react with the available HF or DF in the laser effluent gases with which they mix. Decontamination efficiency is increased with the presence of alkali metal or hydroxide in excess of stoichiometric concentration. Actual concentrations of the reacting components are determined by a variety of factors, such as propellant composition, combustion conditions which influence combustion kinetics, concentration of HF in the laser cavity, and very importantly the relative mass flow rates of the combustion product stream and the laser effluent gases. All of these factors can be effectively manipulated by those skilled in the art to meet particular requirements.

The FIGURE is generally illustrative of a device embodying the invention. Gas generator 1 contains seated in combustion chamber 2 solid gas-generating charge 3 and is provided with restricted nozzle 4. Nozzle 4 opens into aspirator and mixing chamber 5 provided with inlet 6. Inlet 6 is connected to the low-pressure cavity of chemical laser system 7 of conventional construction and, therefore, not shown in detail. Optionally, the laser cavity can be connected to inlet 6 through a pressure-elevating device, such as diffuser 8.

In operation, the gas-generating grain is ignited (by means not shown) and burns to produce high temperature gaseous combustion products including alkali metal hydroxide or free alkali metal components. The combustion products vent through nozzle 4 into chamber 5 in the form of a high-velocity gas jet stream, thereby producing an aspirator-type pumping action which pulls the low-pressure laser effluent gases into the chamber through inlet 6. The combustion gases and laser effluent gases mix in the chamber with resulting reaction of the alkali metal hydroxide or free metal with the HF or DF components in the laser effluent to produce alkali metal fluoride. The chamber should, of course, be of sufficient length to permit adequate mixing and reaction.

The pressure of the combustion gas jet stream issuing from the nozzle is substantially reduced by admixture of the stream with the low-pressure laser effluent. If the ratio of initial to final pressure in the chamber is moderate, the final pressure will be at or above ambient and can be directly discharged from the chamber. If the pressure is reduced below ambient, it can be pressurized to discharge pressure by an appropriate pressurizing device, such as conventional diffuser 9 consisting of convergent section 10, elongated throat section 11, and divergent section 12. It will be understood that other types of pressurizing devices, such as mechanical pumps, can also be employed, but the diffuser is a preferred embodiment.

The decontaminated gases are discharged from the chamber or chamber and diffuser and can then be readily treated to separate the alkali metal fluoride by cooling to its condensation temperature.

In some cases, it may be desirable to increase the pressure of the effluent laser gases from the few torr in the laser cavity by pressurizing device, such as diffuser 8. This can have the advantages of lowering the pumping pressure ratio in the chamber and of reducing the length of the chamber mixing section.

Although this invention has been described with reference to illustrative embodiments thereof, it will be apparent to those skilled in the art that the principles of this invention can be embodied in other forms but within the scope of the claims.

We claim:

1. A device for removing low-pressure effluent gases containing hydrogen fluoride or deuterium fluoride from a chemical laser system and for eliminating from the so-removed gases said hydrogen fluoride or deuterium fluoride, comprising:
   a. a gas generator having a combustion chamber, a gas-generating composition seated in said combustion chamber capable of producing high temperature, gaseous combustion products including gaseous alkali metal hydroxide, gaseous alkali metal, or mixtures thereof, and a restricted nozzle for venting at high velocity said combustion products, and
   b. a chamber connected to said gas generator and adapted to receive the high-velocity combustion gas stream venting from said restricted nozzle, said chamber having inlet means connected to the cavity of a low-pressure hydrogen fluoride- or deuterium fluoride-producing chemical laser as its source of the low-pressure effluent gases, and having exit means for the products resulting from the admixture within said chamber of said combustion product gas stream and said low-pressure effluent gases.

2. The device of claim 1 wherein the alkali metal of said hydroxide or metal is sodium, potassium or lithium.

3. The device of claim 1 wherein the alkali metal of said hydroxide or metal is sodium or potassium.

4. The device of claim 3 wherein the gas-generating composition contains sodium or potassium nitrate.

5. The device of claim 1 wherein the exit means includes means for increasing the pressure of the exiting gases.

6. The device of claim 5 wherein the alkali metal of said hydroxide or metal is sodium, potassium, or lithium.

7. The device of claim 5 wherein the alkali metal of said hydroxide or metal is sodium or potassium.

8. The device of claim 7 wherein the gas-generating composition contains sodium or potassium nitrate.

9. The device of claim 5 wherein the pressurizing means is a diffuser.

10. The device of claim 9 wherein the alkali metal of said hydroxide or metal is sodium, potassium, or lithium.

11. The device of claim 9 wherein the alkali metal of said hydroxide or metal is sodium or potassium.

12. The device of claim 11 wherein the gas-generating composition contains sodium or potassium nitrate.

* * * * *